United States Patent Office 3,224,583
Patented Dec. 21, 1965

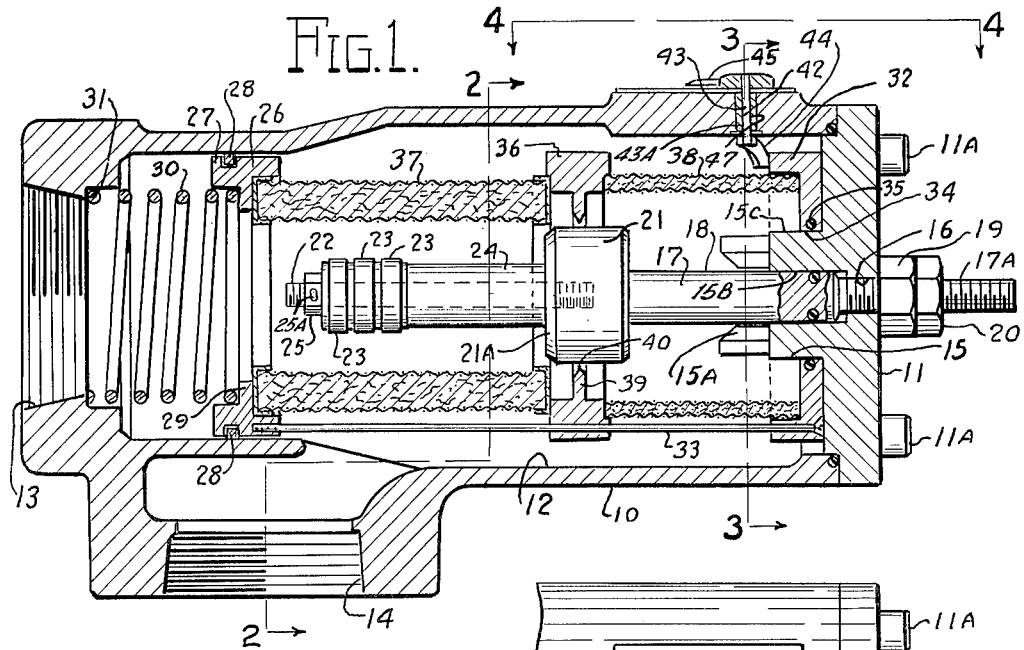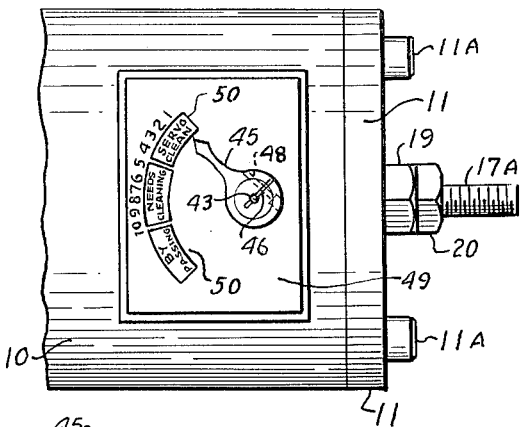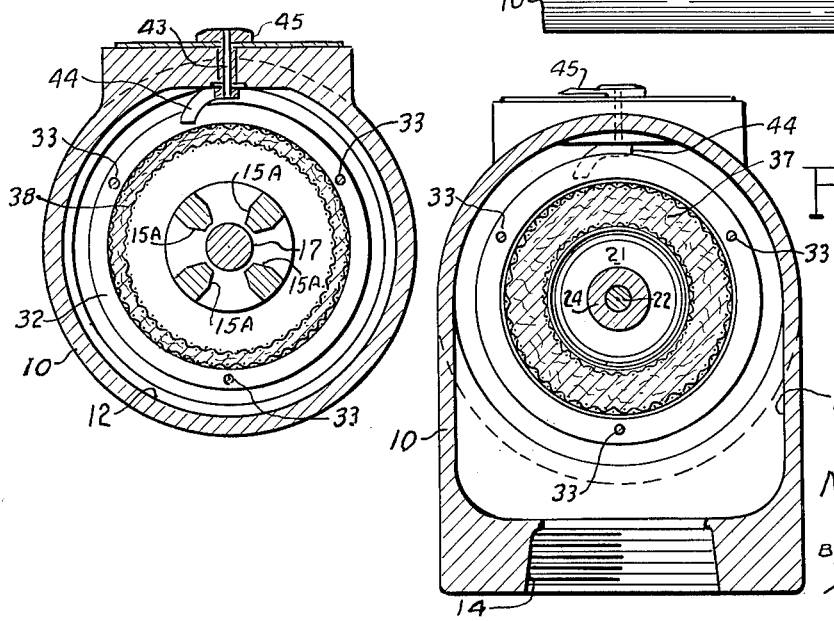

3,224,583
DUAL FILTER DEVICE
Nils O. Rosaen, Bloomfield Hills, Mich., assignor to The Rosaen Filter Company, Hazel Park, Mich., a corporation of Michigan
Filed Apr. 9, 1962, Ser. No. 186,075
8 Claims. (Cl. 210—90)

The present invention relates to a filtering device having a plurality of filtering elements and more particularly to such a device having means proportionally increasing fluid flow through secondary filter elements as a primary filter element becomes clogged.

In fluid filtering systems, unless means are provided for periodically cleaning the filter element in place, it will eventually become clogged, necessitating its removal for replacement or cleaning. As the filter element becomes clogged, a gradual lessening of outlet pressure will result. To diminish the number of times it is necessary to clean or replace the filter element, devices have been heretofore provided utilizing dual filtering elements. When one filter element has become clogged, fluid flow is diverted through the other filter element until it too has become clogged. Such a device, however, does not adequately control the range of outlet pressures. As each filter element in turn becomes clogged, the outlet pressure will gradually diminish.

It is an object of the present invention to maintain a substantially constant outlet pressure for a fluid filtering device by providing means proportionally opening fluid flow through a secondary filter element as a primary filter element becomes increasingly clogged.

It is another object of the present invention to prevent the rupture of filter elements in a dual filter device by providing pressure responsive means operable to open a bypass around the filter elements as each becomes clogged.

Yet further objects and advantages will readily occur to one skilled in the art to which the invention pertains upon reference to the following drawings in which like reference characters refer to like parts throughout the several views and in which FIG. 1 is a cross-sectional view of a preferred embodiment of the present invention, FIG. 2 is a lateral cross-sectional view taken substantially on line 2—2 of FIG. 1, FIG. 3 is a lateral cross-sectional view taken substantially on line 3—3 of FIG. 1, and FIG. 4 is a top elevational view taken substantially on line 4—4 of FIG. 1.

Now referring to the drawings for a detailed description of the present invention, a preferred filter device is shown as comprising a substantially cylindrical housing member 10. A cap member 11 is secured at one end of the housing member 10 by means such as bolts 11A and closes one end of a substantial cylindrical filter chamber 12. An outlet port 13 is provided in the end of the housing 10 opposite the cap member 11. An inlet port 14 is also provided in the housing 10. The inlet port 14 and the outlet port 13 each communicate with the filter chamber 12.

The cap member 11 is provided with a cylindrical boss portion 15 extending axially into the filter chamber 12, and having at its end portion a plurality of annularly spaced slots 15A. The cap member 11 is provided with a threaded opening 16 aligned with the cylindrical boss portion 15. A rod 17 has a threaded end portion 17A carried in the threaded opening 16 and an annular surface 18 which engages an inner surface 15B of the boss portion 15. Lock nuts 19 and 20 are provided on the rod 17 exteriorly of the housing 10 and provide a means for longitudinally adjusting and locking the position of the rod 17.

An annular valve member 21 is carried on the interior end of the rod 17 in a position spaced from the housing 10. The valve member 21 is preferably provided with a beveled edge 21A. A threaded rod 22 is carried by and in axial alignment with the valve member 21. The rod 22 carries a plurality of anngular magnets 23 spaced from the valve member 21 by a spacer 24 and retained on the rod 22 by a nut 25 and cotter pin 25A.

A filter carrier structure 26 is slidably mounted in the filter chamber 12 intermediate the inlet port 14 and the outlet port 13. The filter carrier structure 26 preferably comprises an annulus 27 slidably engaging the housing 10. A ring seal 28 prevents fluid leakage between the annulus 27 and the housing 10. The annulus 27 is provided with an inwardly extending flange portion 29 which provides the seat for one end of a spring member 30. The other end of the spring member 30 is seated against an annulus shoulder 31 provided in the outlet port 13.

The carrier structure 26 also comprises an annular member 32 positioned in alignment with the annulus 27 by means of annularly spaced screws 33. The annular member 32 has a surface portion 34 slidingly engaging an outer surface 15C of the boss portion 15. An O-ring seal 35 prevents fluid leakage between the surface portion 34 and the surface 15C.

A ring member 36 is carried in axial alignment with and intermediate the annulus 27 and the annular member 32 by the threaded rods 33. The ring member 36 separates and retains the end portions of a pair of filter elements 37–38 which are sandwiched between the annulus 27 and the annular member 32. The ring member 36 is provided with an inwardly extending flange portion 39 which terminates in an edge 40 disposed closely adjacent the annular surface of the valve member 21 when the device is in the position illustrated in FIG. 1.

The housing 10 is provided with an opening 42 which rotatably carries a pin 43 sealed by an O-ring 43A. An arm element 44 is secured to an end of the pin 43 and has a portion engaging the annular member 32 so that axial movement of the carrier structure 36 will rotate the pin 43. A pointer element 45 is provided with a slot 46 communicating with a perforation 47. The pointer element 45 is secured to the pin 43 by a screw 48 which passes through the slot 46. An indicator plate 49 is provided on the exterior surface of the housing 10 and provides indicia 50 indicating the axial position of the carrier structure 26.

In the embodiment illustrated, the filter element 37 is provided with a fine porous surface preferably between 10 and 20 microns while the filter element 38 is somewhat coarser for example 74 or 149 microns.

In operation when both filter elements 37 and 38 are clean, fluid entering the inlet port 14 will pass through the filter element 37 and out the outlet port 13. The spring member 30 will retain the carrier structure 26 in the position illustrated in FIG. 1. In this position, the valve member 21 and the flange portion 39 prevent any substantial fluid flow from the outlet side of the filter element 38 to the outlet port 13.

As the filter element 37 becomes clogged, a pressure differential is created across the flange portion 39 and the annulus 27 which will overcome the force of the spring member 30 and move the carrier structure 26 axially in a direction away from the boss portion 15. The carrier structure 26 will continue to move until there is a sufficient flow of fluid past the valve member 21 to equalize the pressures and forces acting on the annulus 27, the annular member 32, and the ring member 36. It is apparent then that the amount of fluid passing through the filter 38 will depend upon the axial position of the carrier structure 26 which in turn depends upon the amount of clogging present in the filter 37.

As the coarse filter 38 becomes clogged, a pressure differential will be produced across the annular member 32 which will move the carrier structure 36 even farther in a direction away from the boss portion 15. This movement will eventually open the slots 15A to the inlet side of the filter elements 37–38 thus providing a bypass route directly from the inlet port 14 to the outlet port 13 which opens when both filters are clogged and before either ruptures.

Since a small amount of fluid will flow past the valve member 21 at all times, the coarse filter element 38 will become partially clogged as the filter element 37 is being used. This means that by the time the carrier structure 26 has moved to a position permitting increased flow through the filter element 38, a cake has formed on the surface of the filter element 38 which in effect transforms it into a fine filter element.

Longitudinal adjustment of the rod 17 will vary the amount of clogging necessary in filter element 37 before the filter element 38 will be put into operation since it will increase or decrease the length of travel of the flange portion 39 necessary to open the passage between the valve member 21 and the flange portion 39.

Each operating position of the filter device depends upon the longitudinal position of the carrier structure; thus each position can be accurately indicated on the exterior surface of the device by means of the indicator.

Although I have described but one preferred embodiment of the present invention, it is apparent that many changes and modifications may be made without departing from the spirit of the invention or the scope of the appended claims.

I claim:
1. A filter device comprising,
    (a) a housing having a substantially cylindrical filter chamber,
    (b) an inlet port and an outlet port being provided in said housing communicating with said filter chamber,
    (c) said housing being provided at one end with a cylindrical boss extending axially into said filter chamber,
    (d) a filter carrier structure slidably carried on said boss and having a portion engaging the inner walls of said housing,
    (e) said filter carrier structure carrying a first and a second filter element intermediate said inlet and said outlet,
    (f) a rod longitudinally adjustably carried in said boss and having an end portion extending into said filter chamber,
    (g) said end portion carrying a valve member intermediate said first and second filter elements,
    (h) means urging said filter carrier structure to abut against said housing adjacent said boss,
    (i) means integral with said filter carrier structure extending closely adjacent to said valve member when said structure abuts said housing whereby fluid flow from the outlet side of said first filter element to the outlet side of said second filter element is prevented, and
    (j) pressure responsive means operable upon an increase in the pressure differential across said second filter element to move said carrier structure away from said boss whereby fluid flow from the outlet side of said first filter element to the outlet side of said second filter element is variably opened.
2. The device as defined in claim 1 and in which said boss is provided with a plurality of annular slots, said slots being spaced from said housing whereby as said carrier structure moves away from said boss, a fluid flow path is opened bypassing said filter elements.

3. The device as defined in claim 1 and including means operable in response to a predetermined pressure differential between the inlet side and the outlet side of said first filter element to open fluid flow from the inlet sides of said first and said second filter elements directly to said outlet whereby a bypass path for fluid flow is opened when both of said filter elements have become clogged.

4. The device as defined in claim 3 and including indicator means carried on the exterior surface of said housing and being operably connected to said first filter element to indicate the axial position thereof.

5. A filter device comprising
    (a) a housing provided with a filter chamber,
    (b) an inlet and an outlet provided in said housing and communicating with said filter chamber,
    (c) a first and second filter element carried in said filter chamber intermediate said inlet and said outlet,
    (d) said filter elements being axially aligned and axially spaced and valve means intermediate the outlet side of said first filter element and the outlet side of said second filter element and being normally in a closed position to close substantially all fluid flow therethrough,
    (e) means responding to an increased pressure differential across said valve means to variably open said valve means whereby fluid flow from the outlet side of said first filter element to said outlet is variably increased as said second filter element becomes clogged,
    (f) said valve means comprising
        a ring element axially movably carried in said filter chamber intermediate and carrying said first and said second filter elements in an axially aligned and an axially spaced position,
        an annular valve member axially adjustably carried in said filter chamber,
        said ring element being provided with an inwardly extending annular flange,
        said annular flange having an end portion closely adjacent and concentric to said valve member, and
        biasing means urging said ring element toward a position overlying said valve member whereby said end portion of said flange will prevent substantially all flow from the outlet side of said first filter element to said outlet.

6. A filter device comprising
    (a) a housing having a substantially cylindrical filter chamber,
    (b) an inlet and an outlet being provided in said housing communicating with said filter chamber,
    (c) said housing being provided at one end with a cylindrical boss extending axially into said filter chamber,
    (d) a filter carrier structure slidably carried on said boss,
    (e) said filter carrier structure carrying a first and a second filter element intermediate said inlet and said outlet,
    (f) an elongated member carried by said boss and having an end portion extending into said filter chamber,
    (g) said end portion carrying a valve member intermediate said first and second filter elements,
    (h) means urging said filter carrier structure to abut against said housing adjacent said boss,
    (i) means carried by said filter carrier structure extending closely adjacent to said valve member when said carrier structure abuts said housing whereby fluid flow from the outlet side of said first filter element to the outlet side of said second filter element is prevented, and
    (j) pressure responsive means operable upon an increase in the pressure differential across said second filter element to move said carrier structure away from said boss whereby fluid flow from the outlet side of said first filter element to the outlet side of said filter element is variably opened.

7. A filter device comprising
(a) a housing provided with a filter chamber,
(b) an inlet and an outlet provided in said housing and communicating with said filter chamber,
(c) a carrier structure axially slidably mounted within said filter chamber,
(d) a first and a second filter element carried by said carrier structure in an axially aligned and axially spaced position,
(e) valve means carried in said housing intermediate said filter elements and including a valve member carried by said carrier structure and movable with said carrier structure intermediate a position closing communication between the outlet sides of said filter elements and a position opening communication between the outlet sides of said filter elements,
(f) means uring said carrier structure toward a position in which said valve member is in the closed position, and
(g) pressure responsive means carried by said carrier structure and operable to respond to increases in the pressure differential across one of said filter elements to move said carrier structure toward a position in which said valve member is in the open position.

8. A filter device comprising
(a) a housing provided with a filter chamber,
(b) an inlet and an outlet provided in said housing and communicating with said filter chamber,
(c) a carrier structure axially slidably mounted within said filter chamber,
(d) a first and a second filter element carried by said carrier structure in an axially aligned position,
(e) valve means carried in said housing intermediate said filter elements and including a valve member carried by said carrier structure and movable with said carrier structure intermediate a position substantially closing communication between the outlet sides of said filter elements and a position opening communication between the outlet sides of said filter elements,
(f) means urging said carrier structure toward a position in which said valve member is in the closed position,
(g) pressure responsive means carried by said carrier structure and operable to respond to increases in the pressure differential across one of said filter elements to move said carrier structure toward a position in which said valve member is in the open position,
(h) means actuated by said carrier structure to open fluid flow directly from the inlet side of said first filter element to said outlet in response to a predetermined differential pressure increase between the inlet and the outlet sides of said first filter element.

References Cited by the Examiner
UNITED STATES PATENTS

| | | | |
|---|---|---|---|
| 2,605,904 | 8/1952 | Ogilvie | 210—132 |
| 2,617,535 | 11/1952 | Hamilton | 210—132 |
| 2,770,368 | 11/1956 | Ticsher | 210—132 |
| 2,868,382 | 1/1959 | Best | 210—130 |
| 2,998,138 | 8/1961 | Mould | 210—90 |
| 3,053,389 | 9/1962 | Rosaen | 210—90 |
| 3,080,058 | 3/1963 | Rosaen | 210—90 |
| 3,080,973 | 3/1963 | Burckhalter | 210—130 |
| 3,120,490 | 2/1964 | Samson | 210—340 |

REUBEN FRIEDMAN, *Primary Examiner.*

HERBERT L. MARTIN, *Examiner.*